United States Patent
Fiveash et al.

[11] Patent Number: 6,076,168
[45] Date of Patent: Jun. 13, 2000

[54] SIMPLIFIED METHOD OF CONFIGURING INTERNET PROTOCOL SECURITY TUNNELS

[75] Inventors: William Alton Fiveash; Xinya Wang; Christiaan Blake Wenzel; Jacqueline Hegedus Wilson; Opral Vanan Wisham, all of Austin, Tex.

[73] Assignee: International Business Machines Corporation, Armonk, N.Y.

[21] Appl. No.: 08/943,166

[22] Filed: Oct. 3, 1997

[51] Int. Cl.[7] .................................................. G06F 13/00
[52] U.S. Cl. ............................................ 713/201; 713/154
[58] Field of Search ........................... 395/186, 187.01, 395/188.01, 200.59; 380/4, 3, 25, 30, 49, 208; 340/825.31, 825.34; 713/154

[56] References Cited

U.S. PATENT DOCUMENTS

| | | | |
|---|---|---|---|
| 5,475,839 | 12/1995 | Watson et al. | 380/4 |
| 5,696,898 | 12/1997 | Baker et al. | 395/187.01 |
| 5,720,033 | 2/1998 | Deo | 395/187.01 |
| 5,757,925 | 5/1998 | Faybishenko | 380/49 |
| 5,781,550 | 7/1998 | Templin et al. | 395/187.01 |
| 5,828,833 | 10/1998 | Belville et al. | 395/187.01 |

*Primary Examiner*—Robert W. Beausoliel, Jr.
*Assistant Examiner*—Pierre E. Elisca
*Attorney, Agent, or Firm*—Yolel Emile

[57] ABSTRACT

A method of securing data traffic between a local and remote host systems is provided. The method includes autogenerating a filter having rules associated with a defined tunnel. The filter rules are used to permit or deny acceptance of transmitted data by the host system and to direct traffic to the tunnel. The tunnel, on the other hand, is used to keep data confidential. The method further includes autogeneration of a counterpart tunnel and associated filter to be used by the remote host when in communication with the local host. The method further autogenerates a new filter to reflect changes to any one of the tunnels and autodeactivates the filter associated with a deleted tunnel.

16 Claims, 10 Drawing Sheets

1 permit 0.0.0.0 0.0.0.0 0.0.0.0 0.0.0.0 no udp eq 4001 eq 4001 both both no all packets 0 all
2 permit 0.0.0.0 0.0.0.0 0.0.0.0 0.0.0.0 no ah any 0 any 0 both both no all packets 0 all
3 permit 0.0.0.0 0.0.0.0 0.0.0.0 0.0.0.0 no esp any 0 any 0 both both no all packets 0 all
4 permit 10.0.0.1 255.255.255.255 10.0.0.2 255.255.255.255 no all any 0 any 0 both outbound no all packets 1 all
5 permit 10.0.0.2 255.255.255.255 10.0.0.1 255.255.255.255 no all any 0 any 0 both inbound no all packets 1 all
6 permit 10.0.0.1 255.255.255.255 10.0.0.3 255.255.255.255 no tcp lt 1024 eq 514 local outbound yes all packets 2 all
7 permit 10.0.0.1 255.255.255.255 10.0.0.1 255.255.255.255 no tcp/ack eq 514 lt 1024 local inbound yes all packets 2 all
8 permit 10.0.0.1 255.255.255.255 10.0.0.3 255.255.255.255 no tcp/ack lt 1024 lt 1024 local outbound yes all packets 2 all
9 permit 10.0.0.3 255.255.255.255 10.0.0.1 255.255.255.255 no tcp lt 1024 lt 1024 local inbound yes all packets 2 all
10 permit 10.0.0.1 255.255.255.255 10.0.0.4 255.255.255.255 no icmp any 0 any 0 local outbound yes all packets 3 all
11 permit 10.0.0.4 255.255.255.255 10.0.0.1 255.255.255.255 no icmp any 0 any 0 local inbound yes all packets 3 all
12 permit 10.0.0.1 255.255.255.255 10.0.0.5 255.255.255.255 no tcp gt 1023 eq 21 local outbound yes all packets 4 all
13 permit 10.0.0.5 255.255.255.255 10.0.0.1 255.255.255.255 no tcp/ack eq 21 gt 1023 local inbound yes all packets 4 all
14 permit 10.0.0.5 255.255.255.255 10.0.0.1 255.255.255.255 no tcp eq 20 gt 1023 local inbound yes all packets 4 all
15 permit 10.0.0.1 255.255.255.255 10.0.0.5 255.255.255.255 no tcp/ack gt 1023 eq 20 local outbound yes all packets 4 all
16 permit 10.0.0.1 255.255.255.255 10.0.0.5 255.255.255.255 no tcp gt 1023 gt 1023 local outbound yes all packets 4 all
17 permit 10.0.0.5 255.255.255.255 10.0.0.1 255.255.255.255 no tcp/ack gt 1023 gt 1023 local inbound yes all packets 4 all
18 permit 0.0.0.0 0.0.0.0 0.0.0.0 0.0.0.0 no all any 0 any 0 both both yes all packets

FIG. 4

SIMPLIFIED METHOD OF CONFIGURING INTERNET PROTOCOL SECURITY TUNNELS

BACKGROUND OF THE INVENTION

1. Field of the Invention

The present invention relates generally to internet protocol security and, more particularly, to a method of generating internet protocol (IP) security tunnels that automatically generates filter rules used for screening data.

2. Description of the Related Art

Internet protocol (IP) security provides security to communications over the internet and within company networks (intranet). The security occurs at the IP protocol layer, thus allowing secure traffic for all application programs without having to make any modifications to the programs themselves. The security is accomplished by either filtering and/or tunneling packets of data.

Filtering is a function in which incoming and outgoing packets of data are accepted or denied based on certain properties. These properties include source and destination addresses, protocol, subnetwork mask, data type (e.g., TCP/IP (transmission control protocol/internet protocol) data or UDP (user datagram protocol) data etc.), port numbers, routing characteristics, tunnel definition etc. Using a filter, a system administrator may control traffic to and from a host computer. For example, employee confidential data may be allowed to be transmitted from $host_1$ to $host_2$ and not vice versa and $host_3$ may be instructed to ignore such data from $host_1$.

Tunneling, on the other hand, is the act of encapsulating or concealing the packets of data as they are traveling over the internet or a communication link. There are two aspects to data encapsulation. One aspect is authentication and the other is encryption. Authentication requires the receiving host to authenticate the data to ensure that the data did come from the transmitting host. Authentication also guarantees data integrity by using a key digest (akin to a checksum function) to disclose whether the packet arrived at its destination unaltered. Data that has to be authenticated is referenced with an authentication header (AH).

Encryption, as the name implies, provides confidentiality by encrypting the data to prevent it from being read by intervening hosts. The receiving host is able to decrypt the data with a key shared with the transmitting host. Data that has been encrypted is referenced with an encryption header (ESP—encapsulating security payload).

When defining a tunnel, a user can choose to encapsulate the entire data packet including IP headers or just the data itself. Encapsulation of only the data allows for faster processing as host systems do not have to decipher the headers to determine whether to transmit, relay, accept or reject the data packet. Encapsulation of only the data is ordinarily done when a trusted network is used.

Several steps are necessary in order to activate a tunnel. Specifically, four separate commands are used. One command is used to define the tunnel and another to define the filter rules associated with the tunnel. A third command is used to activate the filter and a fourth to activate the tunnel. (Note that using a tunnel necessitates the use of a filter, however, filtering data does not require that a tunnel be used.) Based on the foregoing, therefore, it is obvious that several options have to be set before a tunnel can be operational. This can be a very cumbersome and tedious task. The complexity of the task may be further exacerbated by mistakes and omissions. Any one of those mistakes or omissions may lead to the cessation of traffic to and from the host.

Consequently, there is a need in the art for a method of simplifying the process of activating a tunnel and thereby minimizing the chance of a system breakdown.

SUMMARY OF THE INVENTION

The need in the art is addressed by the present invention. The present invention provides a method of providing secure data traffic between a local and remote host systems by autogenerating filter rules associated with a defined tunnel. The filter rules are used to permit or deny acceptance of transmitted data by the host system. The present invention further provides for the autogeneration of a counterpart tunnel and associated filter rules to be used by the remote host when in communication with the local host. Thus, a user needs only defined a local tunnel to be able to transact secure data between two host systems. Furthermore, the invention autogenerates a new filter to reflect changes to any one of the tunnels and autodeactivates the filter associated with a deleted tunnel.

BRIEF DESCRIPTION OF THE DRAWING

FIG. 4 is an example of filter rules.

DESCRIPTION OF THE INVENTION

Figure 1:
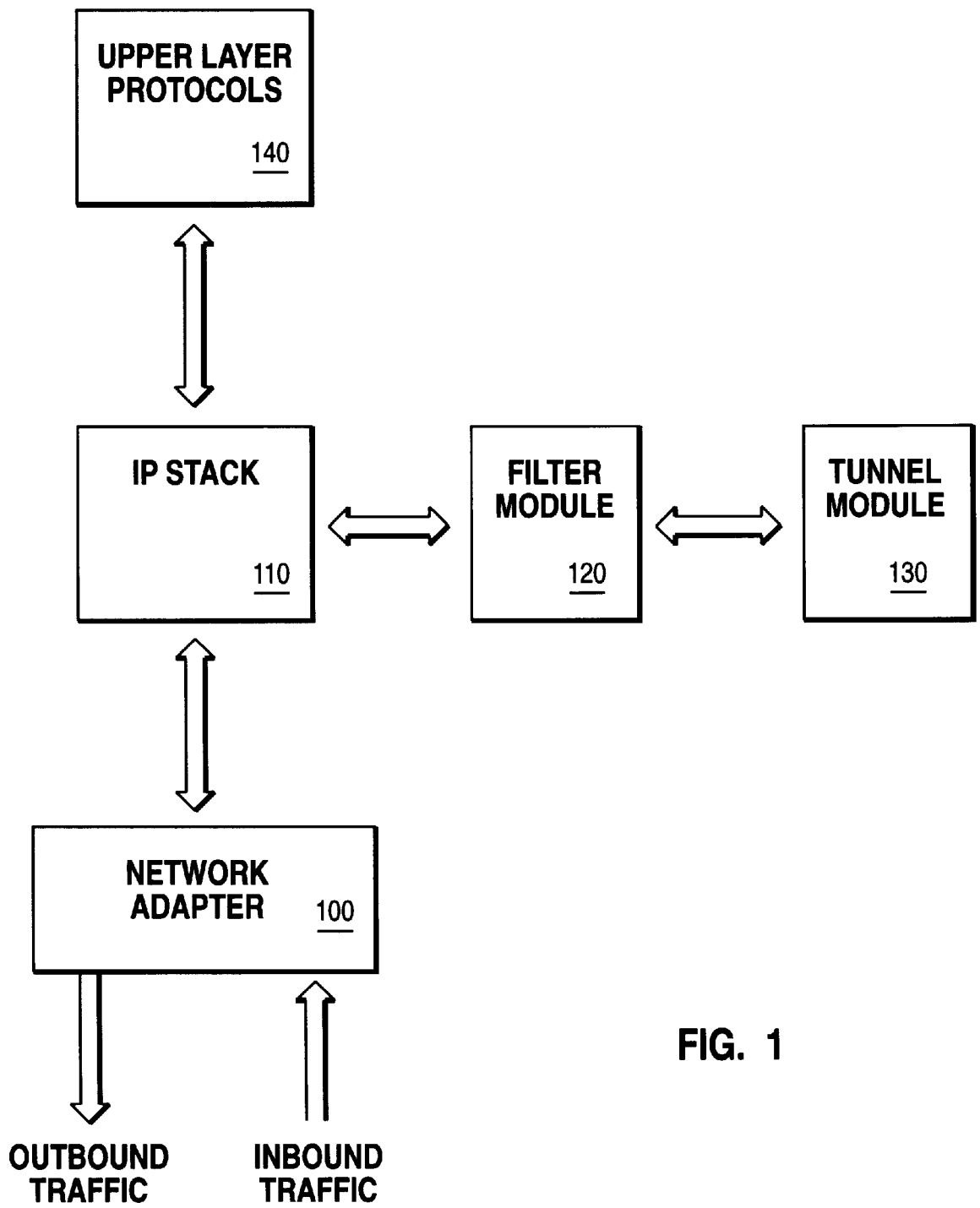
FIG. 1 is a block diagram of an internet protocol security of a host system.

FIG. 1 is a block diagram of an internet protocol security of a host system. The internet security comprises a network adapter 100, an IP stack 110, a filter module 120, a tunnel module 130 and an upper layer protocols 140.

Network adapter 100 is a communication adapter that allows the host system, to which it is connected, access to other host systems. Oftentimes, it is a local area network (LAN) adapter for intranet communication or a modem adapter for communication over the internet. Filter module 120 and tunnel module 130 contain all the filter rules and tunnel definitions, respectively, used by the host system.

Figure 2:
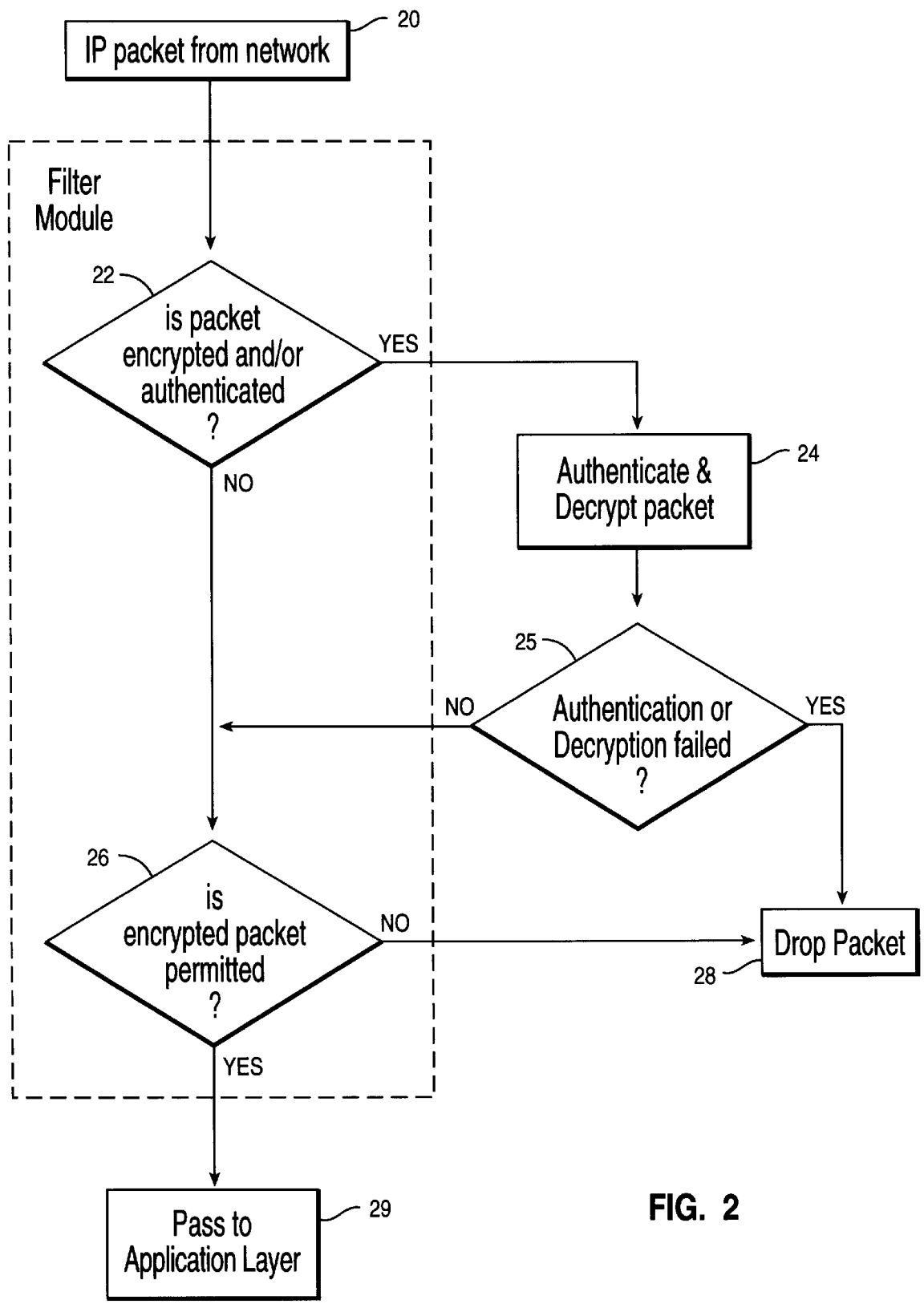
FIG. 2 is a flow diagram of an IP security processing of an inbound data packet.

FIG. 2 is a flow diagram of an IP security processing of an inbound data packet. At step 20 a data packet is received at the network adapter 100. At step 22, it is determined whether the data packet is encrypted and/or whether authentication is required. If so, the data packet is decrypted and/or authenticated at step 24. Then it is determined whether authentication or decryption of the packet has failed (step 25). If yes, the packet is dropped (step 28). If the packet was not encrypted and/or authentication is not required or if the packet has been decrypted and/or authenticated, it is determined whether the data packet should be permitted or denied at step 26. If the packet is not to be permitted, the data packet is dropped at step 28, otherwise the data packet is passed to the application layer 29.

Figure 3:
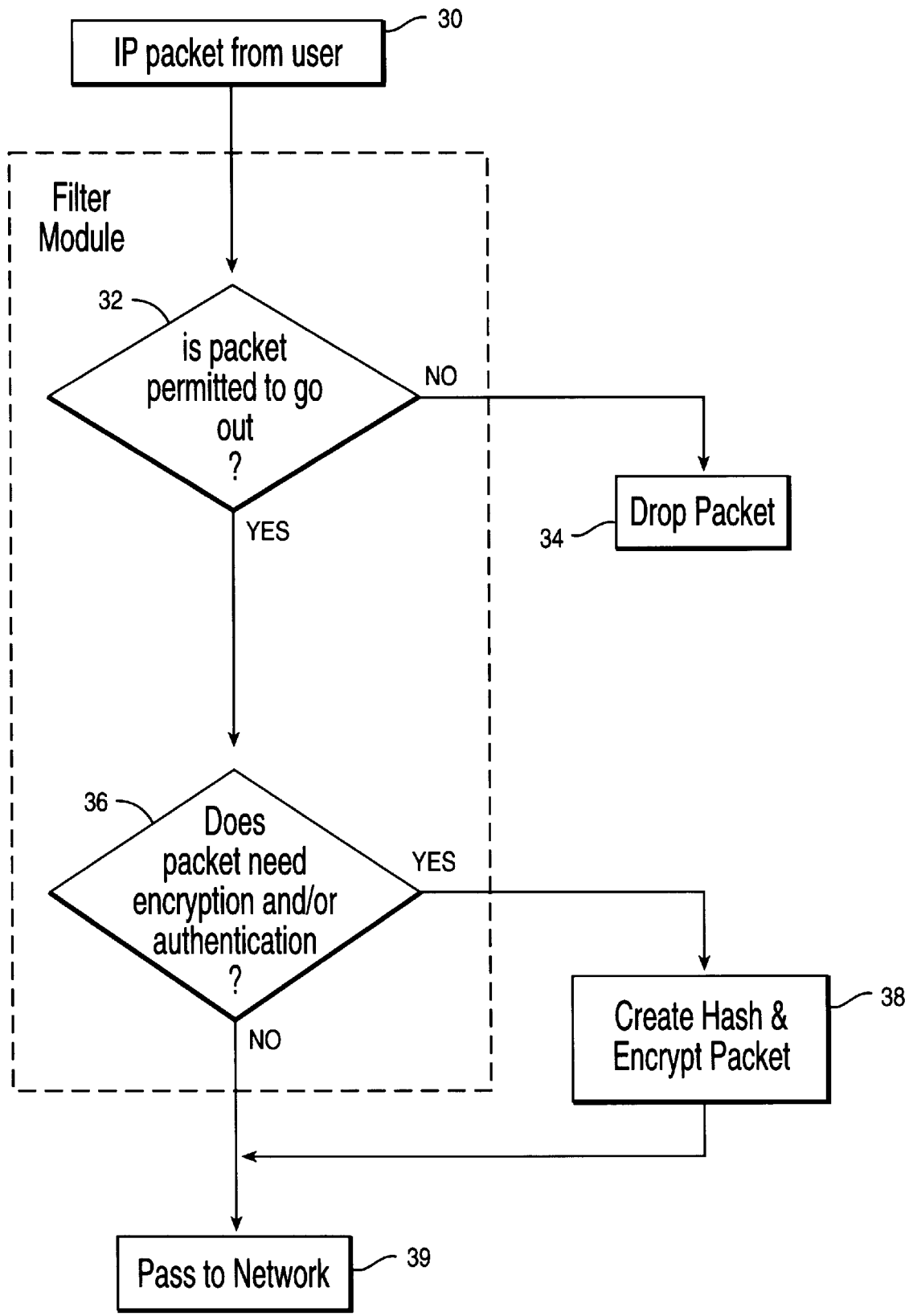
FIG. 3 is a flow diagram of an IP security processing of an outbound data packet.

This process occurs in reverse order for outbound data packets. FIG. 3 is a flow diagram of an IP security processing of an outbound data packet. The data packet is moved to the IP stack 110 at step 30. At step 32 it is determined whether the data packet is permitted to go out of the system. If no, the data packet is dropped 34, otherwise, it is determined whether the data packet is to be encrypted or authenticated by the remote host at step 36. If the data is to be encrypted and should be authenticated by the remote host, it is encrypted and the headers ESP and AH added before it is passed to the network (steps 38 and 39). If the data is not to be encrypted, it is sent to the network adapter 100 to be passed to the network (step 39).

As mentioned above, the filter module 120 contains all the rules needed to determine whether data packets are allowed in and out of the host system. FIG. 4 is an example of the rules that the filter module 120 may use. Note that each line represents a rule. The fields are:

Action Source_address Source_mask Destination_address Destination_mask Source_routing Protocol Source_port-operand Source_port_operation Destination-port_operand Destination_port_operation Scope Direction Logging_control Fragment_control Tunnel_ID_number Interface Rule 1 uses port number 4001 to control data packets for refreshing the session key. It is an example of how the port number can be used for a specific purpose. Rules 2 and 3 are used to allow processing of AH and ESP headers, respectively.

Rules 4 and 5 filter traffic between addresses 10.0.0.1 and 10.0.0.2 through tunnel 1. Rule 4 is for outbound traffic and rule 5 is for inbound traffic.

Rules 6 through 9 filter outbound rsh (remote shell execution on a remote host), rcp (remote file copy), rdump (remote system dump), rrestore (remote restore) and rdist (remote file distribution) services between addresses 10.0.0.1 and 10.0.0.3 through tunnel 2. Here logging is set to yes so that this type of traffic may be monitored.

Rules 10 and 11 filter both inbound and outbound ICMP (internet control message protocol) services of any type between addresses 10.0.0.1 and 10.0.0.4 through tunnel 3.

Rules 12 through 17 filter outbound FTP (file transfer protocol) service from addresses 10.0.0.1 and 10.0.0.5 through tunnel 4.

Rule 18 permits all packets that do not match filter rules 1 to 17. This rule could have as well been set to deny all packets that do not match filter rules 1–17.

Obviously, the parameters of each of the rules have to be set by the user of the host system. As alluded to before, this task is prone to errors and omissions, especially if the user is unsophisticated. Thus, the invention allows a user to forgo configuring a filter when generating a tunnel. That is, as long as all traffic between the two hosts goes through the tunnel, the necessary filter rules may be automatically generated.

In addition, the process of setting up a tunnel encompasses defining the tunnel including associated filter rules on one end, creating a matching definition on the other end and activating the tunnel and filter rules on both ends. The present invention further provides for the autogeneration of a counterpart tunnel including its associated filter rules to be used by a remote host if information regarding the counterpart tunnel is not explicitly supplied. The information about the counterpart tunnel and associated filter rules is made to match that of the host system. For instance, encryption and authentication algorithms specified for the local host will be used for the remote host if the remote values are not specified.

The following is a sample command to generate a manual tunnel:

gentun—v4—t manual—s 10.0.0.1—d 10.0.0.2—a HMAC_MD5—e DES_CBC_8—N 23567

This command generates the following tunnel:

| | |
|---|---|
| Tunnel ID | 1 (default number) |
| IP Version | IPv4 |
| Source address | 10.0.0.1 |
| Destination address | 10.0.0.2 |
| Policy | auth/encr |
| Tunnel Mode | tunnel |
| Send AH Algo. | HMAC_MD5 |
| Send ESP Algo. | DES_CBC_8 |
| Receive AH Algo. | HMAC_MD5 |
| Receive ESP Algo | DES_CBC_8 |
| Source AH SPI | 300 |
| Source ESP SPI | 300 |
| Destination AH SPI | 23567 |
| Destination ESP SPI | 23567 |
| Tunnel Lifetime | 480 |
| Status | inactive |
| Target | |
| Target Mask | |
| Replay | no |
| New Header | Yes |
| Send ENC-MAC Algo. | |
| Receive ENC-MAC Algo | |

The filter rules associated with the tunnel will be automatically generated. For example Rule 19, for processing outbound data packets, and rule 20, for processing inbound data packets, will be automatically generated as follows:

| | Rule 19 | Rule 20 |
|---|---|---|
| Rule Action | permit | permit |
| Source Address | 10.0.0.1 | 10.0.0.2 |
| Source Mask | 255.255.255.255 | 255.255.255.255 |
| Dest. Address | 5.5.5.8 | 5.5.5.19 |
| Dest. Mask | 255.255.255.255 | 255.255.255.255 |
| Source Routing | yes | yes |
| Protocol | all | all |
| Source Port | any | any |
| Destination Port | any | any |
| Scope | both | both |
| Direction | outbound | inbound |
| Logging Control | no | no |
| Fragment Control | all packets | all packets |
| Tunnel ID Number | 1 | 1 |
| Interface | all | all |
| Auto Generated | yes | yes |

Note that mask 255.255.255.255 signifies that all the bits are turned on. Thus, the address has to be an exact match. For example, for the source both default values and values taken from the gentun command are used to generate the filter rules 19 and 20.

Of course, sophisticated users can always define specific filter rules by employing either the genfilt (generate filter) or chfilt (change filter) command. The parameters that can be specified are listed below:

| | |
|---|---|
| -v | IP version (presently 4 or 6) |
| -a | action: d for deny and p for permit |
| -s | source address (IP address or host name) |
| -m | source subnet mask |
| -d | destination address (IP address or host name) |
| -M | destination subnet mask |
| -g | source routing control: y or n |
| -c | protocol (udp, icmp, tcp, tcp/ack, ospf, pip, esp, ah, and all |
| -o | source port or ICMP code operation |
| -p | source port or ICMP code operand |
| -O | destination port or ICMP code operation |
| -P | destination port or ICMP code operand |
| -w | direction (i for inbound, o for outbound and b for both inbound and outbound packets) |
| -r | routing (f for forwarded packets, l for local packets and b for both local and forwarded packets) |
| -l | logging control, y to include in log and n for no |
| -f | fragmentation, y to apply to fragments, h for fragment header and n for no fragments |
| -t | tunnel ID |
| -i | interface, such as tr0 and en0 |

Figure 5:
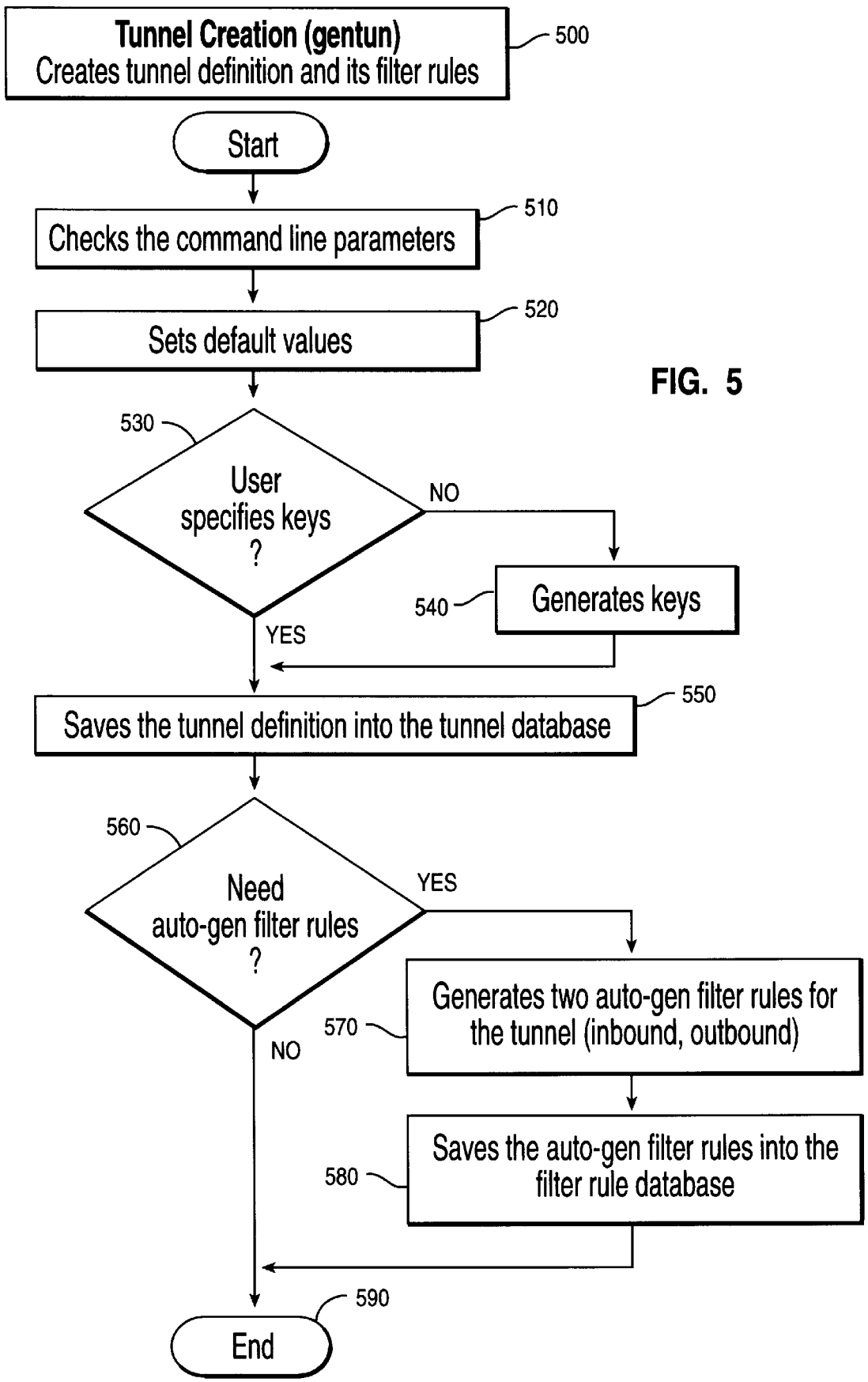
FIG. 5 is a flow diagram of a creation of a tunnel and its filter rules in accordance with the present invention.

FIG. 5 is a flow diagram of the creation of a tunnel and its filter rules in accordance with the present invention. When the host system processes the gentun command, it parses the parameters for valid values 510. A minimum set of parameters are necessary to identify a tunnel. Default values are generated for parameters that are not provided 520. Then, it is determined whether keys are specified (step 530). Keys that are not specified are generated 540. Both generated keys and specified keys are saved in the tunnel database 550. Then, it is determined whether to autogenerate filter rules for the tunnel 560. If so, the rules are generated for both inbound and outbound traffics 570 and saved in the filter rule database 580 before the end of the process is reached 590. If filter rules need not be autogenerated, which happens when the user specifically prohibits so by setting a flag, the process then reaches the end 590.

Figure 6:
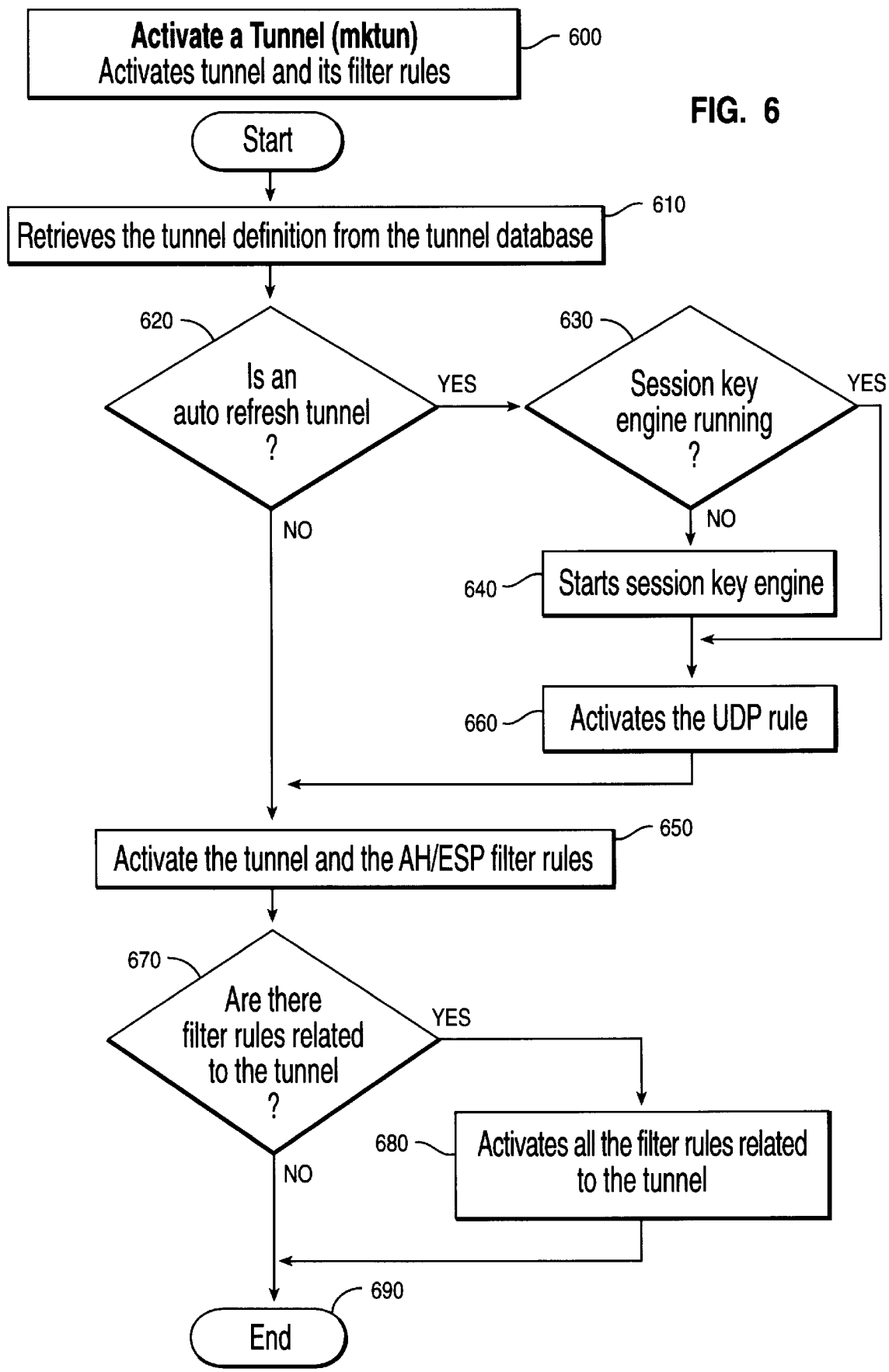
FIG. 6 depicts a flow diagram of an activation of a tunnel as well as its filter rules in accordance with the present invention.

FIG. 6 depicts a flow diagram of the activation of the tunnel as well as its filter rules in accordance with the present invention. The activation is prompted by the mktun command 600. The user can specify a particular tunnel or a set of tunnels to be activated. Activating a tunnel comprises reading the description of the tunnel from the database and inserts it into a kernel for use by IP traffic 610. The tunnel definition determines what kind of authentication and/or encryption algorithm is to be used on each packet flowing between the local and the remote hosts. Then it is determined whether the tunnel is an auto refresh tunnel 620. If it is an auto refresh tunnel, (i.e., cryptographic keys are refreshed automatically during the session), then it is determined whether the session key engine is running 630. If not, the session key engine is started 640. When the session key engine is running, the UDP rule is added to the filter table to allow for the processing of the data that refreshes the key 660. After activating the UDP rule or if it is not an autorefresh tunnel, the AH and ESP filter rules are added to the filter table 650 then the tunnel is activated by loading the tunnel context into the kernel's table of active tunnels. In addition to loading the AH and ESP filter rules, any rules that are specifically defined by the user are also loaded 680. Then the process reaches the end 690.

Figure 7:
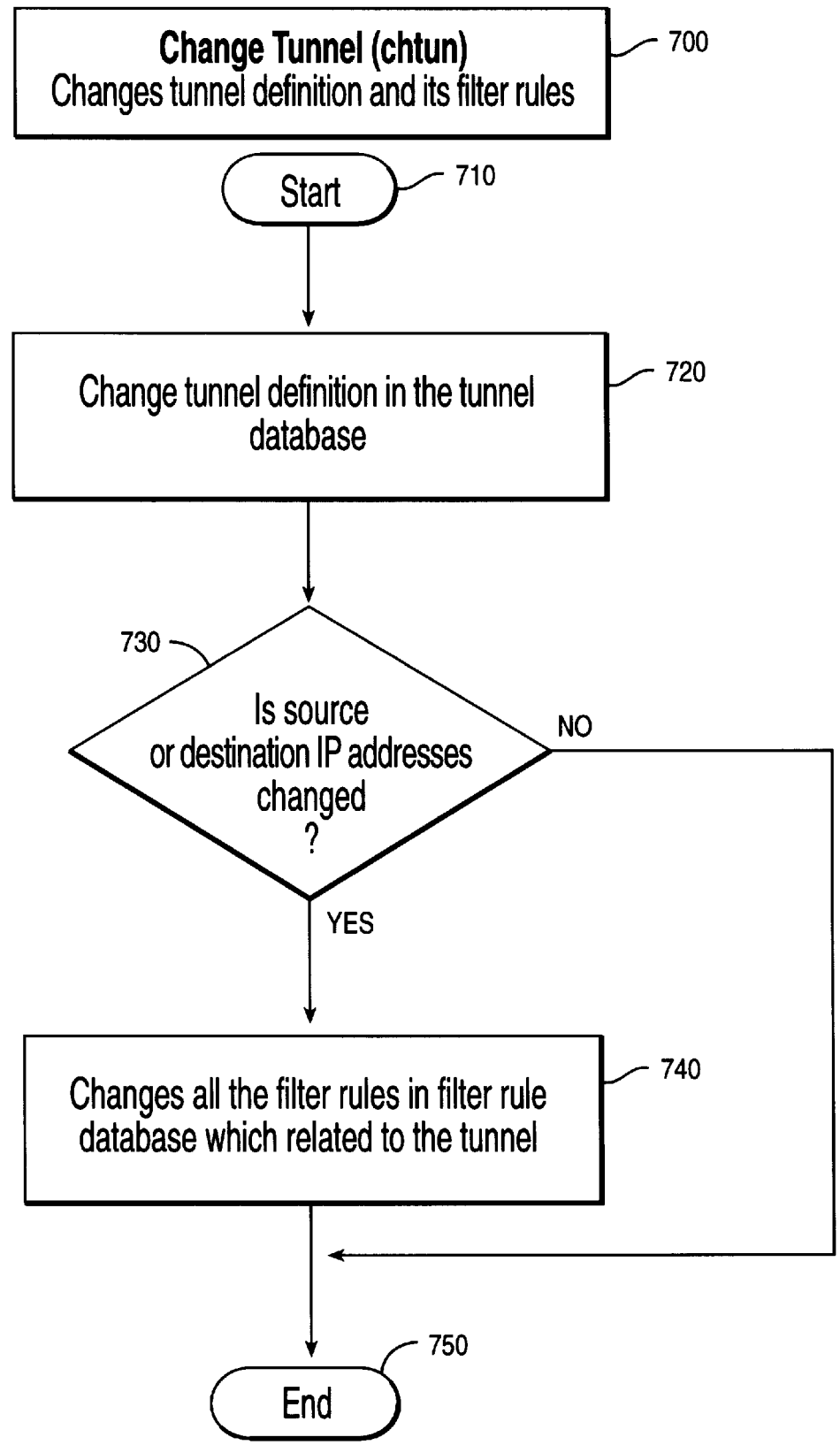
FIG. 7 is a flow diagram of a modification of a tunnel in accordance with the present invention.

FIG. 7 is a flow diagram of a tunnel modification in accordance with the present invention. Some or all parameters of a tunnel may be modified. This can, of course, affect the filter rules if the source and destination addresses are changed. To start, the parameters of the chtun command are parsed 710 and stored in the tunnel definition database 720. Then a check is made to determine whether the source or destination address has changed 730. If so, all the filter rules related to the changed parameter are replaced by filter rules associated with the new parameter 740 before the process is ended 750. If the source or destination is not changed the process reaches the end 650.

Figure 8:
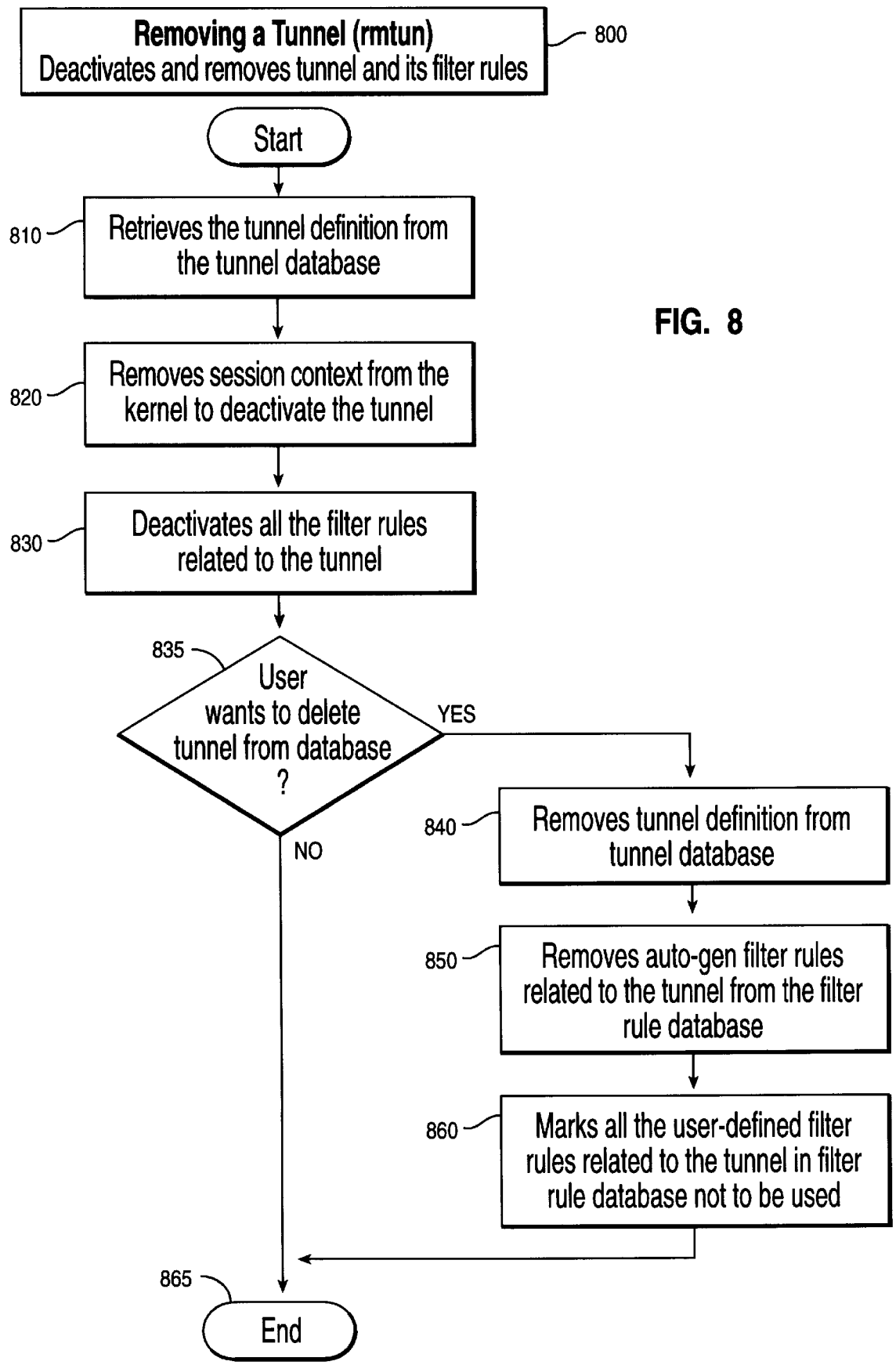
FIG. 8 is a flow diagram of the removal of a tunnel in accordance with the present invention.

FIG. 8 is a flow diagram of a tunnel removal in accordance with the present invention. The rmtun 800 will deactivate a tunnel by (1) retrieving the tunnel definition from the database 810, (2) removing the master key context session from the kernel to deactivate the tunnel and (3) deactivating all filter rules related to the tunnel 830. If the user wants to delete the tunnel definition from the database 835, the tunnel definitions will be removed 840, the autogenerated filter rules removed 850 and all user-defined filter rules related to the tunnel are disabled before the end is reached 865.

In order to simplify the administration of many machines, tunnel definitions may be either exported from one machine or imported into a machine. This aids in setting multiple machines with like IP security setups and reduces the chance of making errors. For greater security, the matching definitions may be saved on a memory disk and mailed or sent to the remote location by courier.

Figure 9:
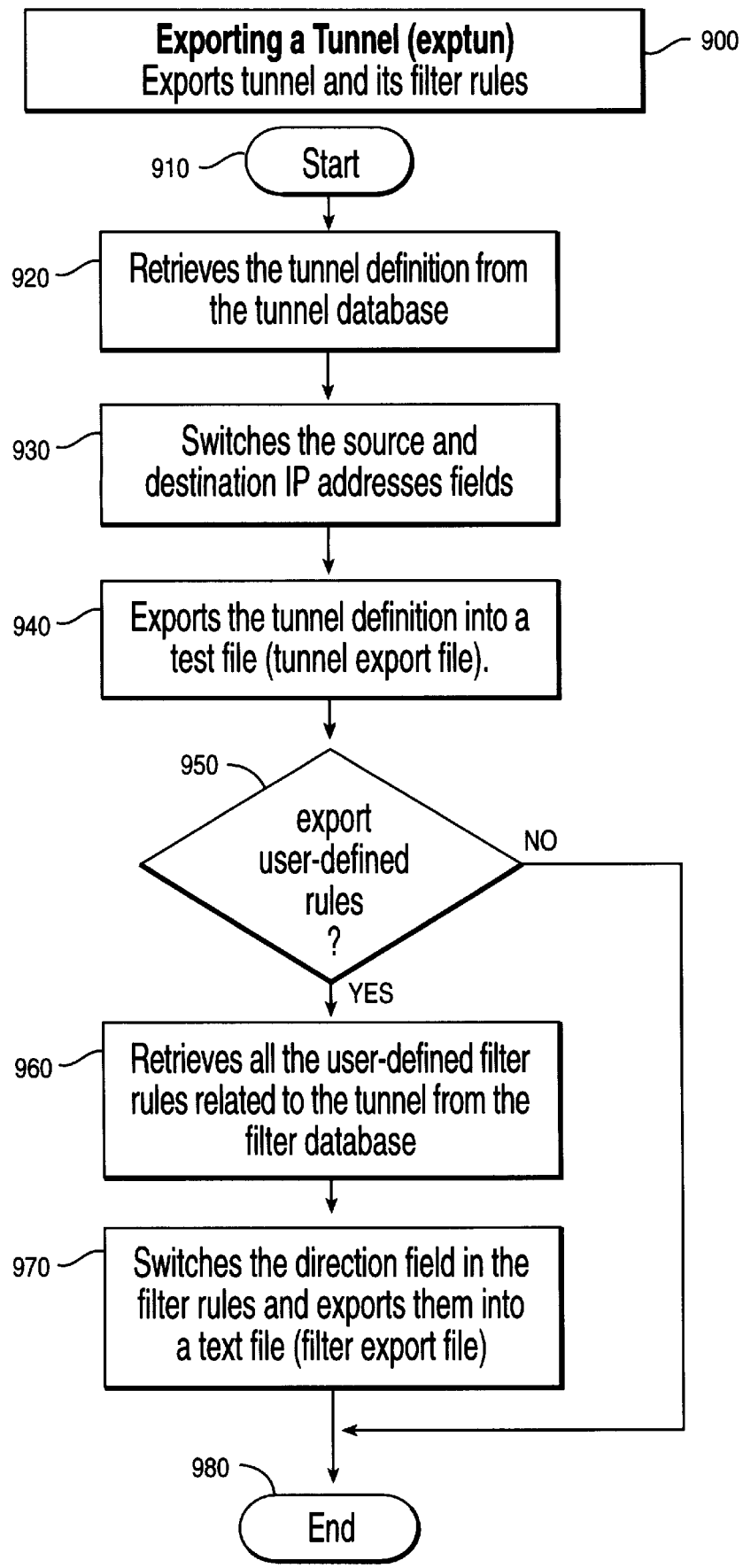
FIG. 9 is a flow diagram of a tunnel exportation to a remote host in accordance with the present invention.

FIG. 9 is a flow diagram of a tunnel exportation to a remote host in accordance with the present invention. The tunnel definitions are retrieved from the database 920. The source and destination addresses are switched 930. A filter export file is generated to hold the tunnel definitions 940. A check is made as to whether user-defined filter rules should also be exported. If no, then the end 980 is reached. If yes, all the user-defined filter rules related to the tunnel are retrieved 960, the direction field (i.e., inbound, outbound) of the filter rules is reversed before the rules are saved into a filter export file 970. Then, the end is reached 980.

Figure 10:
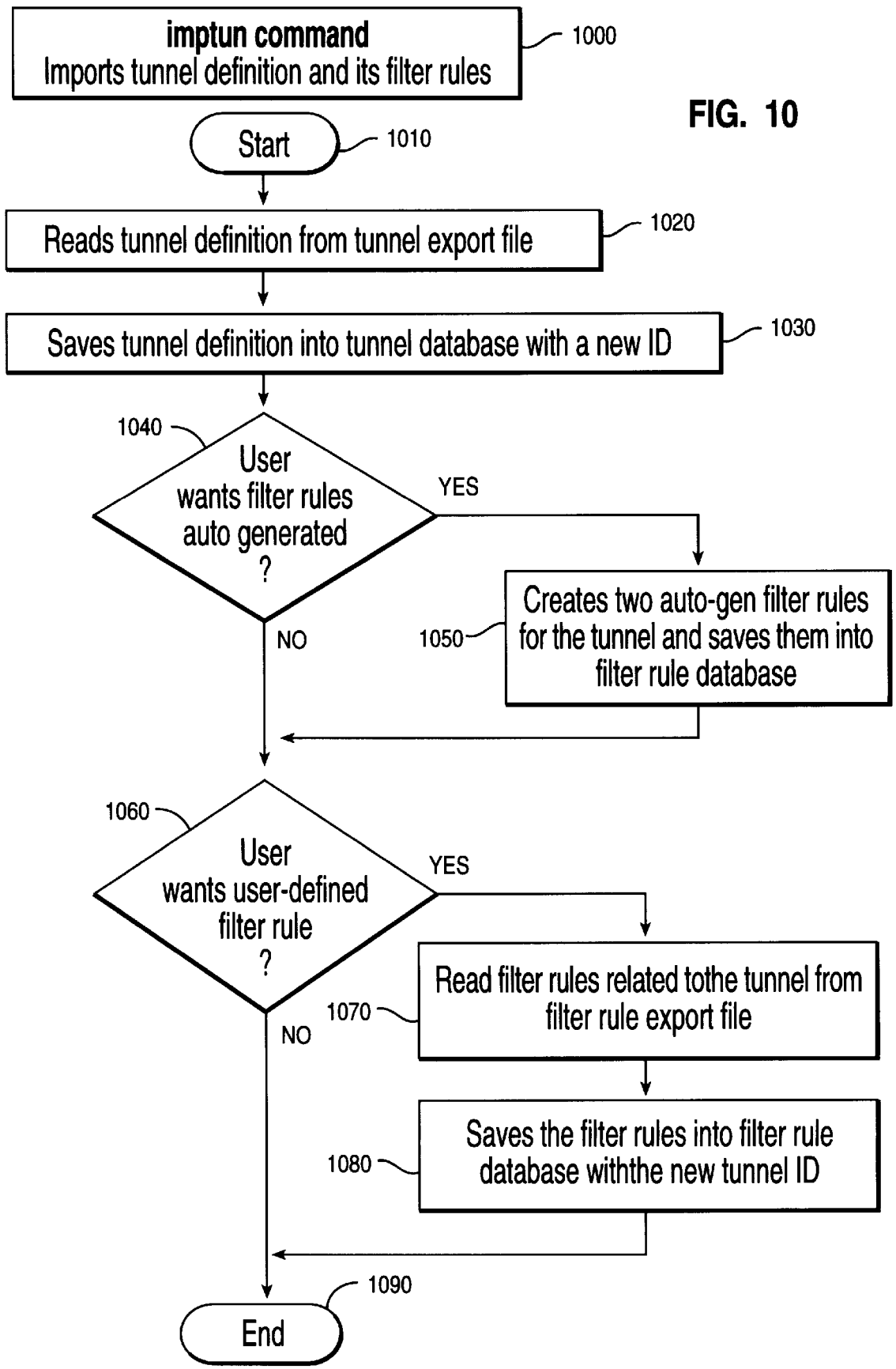
FIG. 10 is a flow diagram of a tunnel importation from a remote host in accordance with the present invention.

FIG. 10 is a flow diagram of a tunnel importation from a remote host in accordance with the present invention. The tunnel definition is read from the tunnel export file 1020. The tunnel definition is saved into a tunnel database possibly with a new identification 1030. If the user wants filter rules to be autogenerated, they are generated and saved into a filter rule database 1050. If they are user-defined filter rules, they are read from the filter rule export file 1070 and saved into the filter rule database with a new tunnel identification 1080 before reaching the end 1090. Once the tunnel is activated using the mktun command, the filter rules for that tunnel will be automatically activated as well.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A method of providing secure data traffic between a local and remote host systems comprising the steps of:

defining a first tunnel; and autogenerating, in response to the definition of the first tunnel, a first filter, said first filter including rules for permitting or denying acceptance of inbound data and for permitting or denying transmission of outbound data.

2. The method of claim 1 wherein said first tunnel is defined at said local host system to be used by said local host system.

3. The method of claim 2 further comprising the step of autogenerating a second tunnel by said local host system for use by said remote host system.

4. The method of claim 3 further comprising the step of autogenerating a second filter in response to said autogeneration of said second tunnel.

5. The method of claim 4 further comprising the steps of:
determining whether a source or destination address has changed after a modification of said first or second tunnel; and
autogenerating, in response to said modified tunnel, a third filter if said source or destination address has changed.

6. The method of claim 5 further comprising the step of automatically deactivating said first or second filter if said first or second tunnel is deleted.

7. The method of claim 6 further comprising the step of exporting said second tunnel and said second filter to said remote host system by said local host system.

8. The method of claim 6 further comprising the step of importing said second tunnel and said second filter from said local host system by said remote host system.

9. A computer program product for use with a computer system, said computer program product having computer readable program code means embodied in a medium, said computer program code means comprising:
program code means for defining a first tunnel; and
program code means for autogenerating, in response to the definition of the first tunnel, a first filter, said first filter including rules for permitting or denying acceptance of inbound data and for permitting or denying transmission of outbound data.

10. The computer program product of claim 9 wherein said first tunnel is defined at said local host system to be used by said local host system.

11. The computer program product of claim 10 wherein said computer readable program code means further comprising program code means for autogenerating a second tunnel by said local host system for use by said remote host system.

12. The computer program product of claim 11 wherein said computer readable program code means further comprising program code means for autogenerating a second filter in response to said autogeneration of said second tunnel.

13. The computer program product of claim 12 wherein said computer readable program code means further comprising:
program code means for determining whether a source or destination address has changed after a modification of said first or second tunnel; and
program code means for autogenerating, in response to said modified tunnel, a third filter if said source or destination address has changed.

14. The computer program product of claim 13 wherein said computer readable program code means further comprising program code means for automatically deactivating said first or second filter if said first or second tunnel is deleted.

15. The computer program product of claim 14 wherein said computer readable program code means further comprising program code means for exporting said second tunnel and said second filter to said remote host system by said local host system.

16. The computer program product of claim 14 wherein said computer readable program code means further comprising program code means for importing said second tunnel and said second filter from said local host system by said remote host system.

* * * * *